United States Patent [19]

Fennern et al.

[11] Patent Number: 5,202,084

[45] Date of Patent: Apr. 13, 1993

[54] BI-LEVEL REACTOR INCLUDING STEAM SEPARATORS

[75] Inventors: Larry E. Fennern, San Jose; Daniel R. Wilkins, Saratoga, both of Calif.

[73] Assignee: General Electric Company, San Jose, Calif.

[21] Appl. No.: 744,855

[22] Filed: Aug. 14, 1991

Related U.S. Application Data

[63] Continuation-in-part of Ser. No. 553,073, Jul. 10, 1990, Pat. No. 5,116,567.

[51] Int. Cl.$^5$ ............................................. G21C 3/04
[52] U.S. Cl. ..................................... 376/433; 376/371
[58] Field of Search ................ 376/370, 371, 433, 377

[56] References Cited

U.S. PATENT DOCUMENTS 5,116,567  5/1992  Fennern et al. ..................... 376/433

OTHER PUBLICATIONS

M. A. Schultz et al., "A New Steam-Cooled Reactor", Nuclear Science and Engineering, 1985, pp. 391-399.
Y. Ishiguro et al., "Pancake Core High Conversion Light Water Reactor Concept," Nuclear Technology, vol. 84, Mar. 1989, pp. 331-343.
P. N. Alekseev et al., "Steam-Water Power Reactor Concept," Reference and date unknown, pp. 6-1 through 6-17.
Wilkins et al., *Advanced BWR: Design Improvements Build on Proven Technology*, Nuclear Engineering International, reprint Jun. 1986, pp. 1-7 and drawing entitled "The World's Reactors No 89".
Foster et al., "Basic Nuclear Engineering," 1977, cover and copyright pages, and pp. 427-488.

*Primary Examiner*—Donald P. Walsh
*Assistant Examiner*—Frederick H. Voss
*Attorney, Agent, or Firm*—Robert R. Schroeder

[57] ABSTRACT

A nuclear reactor with a recirculating heat transfer fluid has a bi-level core which provides enhanced flexibility in fuel arrangement. The bi-level core includes a first core, a plurality of steam separators disposed above the first core, and a second core disposed above the steam separators all inside a single pressure vessel. The steam separators receive a steam and water mixture from the first core and separate the water from the steam. The separated steam is channeled to the second core which cools the second core resulting in the generation of superheated steam. Preferably, fuel bundles of the second core are arranged in vertical alignment with fuel bundles of the first core. This permits a fuel bundle of the first core to be accessed by removing only the adjacent fuel bundle of the second core. During refueling operations, fuel bundles can be shifted from one core to the other, providing additional flexibility in arranging units at various states of burnup. The bi-level core allows fuel to be initially positioned in the second core for conversion of fertile fuel to fissile fuel, and then repositioned to the first core for more complete axial burnup. The steam separators disposed between the first and second cores control the quality of steam channeled into the second core, and allow any crud to remain in solution in the separated water for being removed without buildup in the cores during operation.

13 Claims, 3 Drawing Sheets

BI-LEVEL REACTOR INCLUDING STEAM SEPARATORS

This is a continuation-in part-of application Ser. No. 07/553,073 filed Jul. 10, 1990, now U.S. Pat. No. 5,116,567.

TECHNICAL FIELD

This invention relates generally to nuclear reactors, and, more particularly, to a reactor having improved fuel arrangements in a reactor core.

BACKGROUND ART

Fission reactors rely on fissioning of fissile atoms such as uranium isotopes ($U^{233}$, $U^{235}$) and plutonium isotopes ($Pu^{239}$, $Pu^{241}$). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in modular units. These units can be bundles of vertically extending fuel rods. Each rod has a cladding which encloses a stack of fissile fuel pellets. Generally, each rod includes a space or "plenum" for accumulating gaseous byproducts of fission reactions which might otherwise unacceptably pressurize the rod and lead to its rupture. The bundles are arranged in a two-dimensional array in the reactor to form a "core". Neutron-absorbing control rods are inserted between or within fuel bundles to control the reactivity of the core. The reactivity of the core can be adjusted by incremental insertions and withdrawals of the control rods.

Both economic and safety considerations favor improved fuel utilization, which can mean less frequent refueling and less exposure to radiation from a reactor interior. In addition, improved fuel utilization generally implies more complete fuel "burnups", or fissioning.

A major obstacle to obtaining long fuel element lifetimes and complete fuel burnups is the inhomogeneities of the neutron flux both radially and axially throughout the core. For example, fuel bundles near the center of the core are surrounded by other fuel elements. Accordingly, the neutron flux at these central fuel bundles exceeds the neutron flux at peripheral fuel bundles which have one or more sides facing away from the rest of the fuel elements. Therefore, peripheral fuel bundles tend to burn up more slowly than do the more central fuel bundles.

The problem of flux density variations with radial core position has been addressed by repositioning fuel bundles between central and peripheral positions. This results in extended fuel bundle lifetimes at the expense of additional refueling operations.

Variations in neutron flux density occur in the axial direction as well as the radial direction. For example, fuel near the top or bottom of a fuel bundle is subjected to less neutron flux than is fuel located midway up a fuel bundle. These axial variations are not effectively addressed by radial redistribution of fuel elements.

In addition to the variations in neutron flux density, variations in spectral distribution affect burnup. For example, in a boiling-water reactor (BWR), neutrons released during fissioning move too quickly and have too high an energy to readily induce the further fissioning required to sustain a chain reaction. These high energy neutrons are known as "fast" neutrons. Slower neutrons, referred to as "thermal neutrons", most readily induce fission.

In BWRs, thermal neutrons are formerly fast neutrons that have been slowed primarily through collisions with hydrogen atoms in the water (moderator) used as the heat transfer medium. Between the energy levels of thermal and fast neutrons are "epi-thermal" neutrons. Epithermal neutrons exceed the desired energy for inducing fission but promote resonance absorption by many actinide series isotopes, converting some "fertile" isotopes to "fissile" (fissionable) isotopes. For example, epithermal neutrons are effective at converting fertile $U^{238}$ to fissile $Pu^{239}$. Within a core, the percentages of thermal, epithermal and fast neutrons vary over the axial extent of the core.

Axial variations in neutron spectra are caused in part by variations in the density or void fraction of the water flowing up the core. In a boiling-water reactor (BWR), water entering the bottom of a core is essentially completely in the liquid phase. Water flowing up through the core boils, so most of the volume of water exiting the top of the core is in the vapor phase, i.e., steam. Steam is less effective than liquid water as a neutron moderator due to the lower density of the vapor phase. Therefore, from the point of view of neutron moderation, core volumes occupied by steam are considered "voids"; the amount of steam at any spatial region in the core can be characterized by a "void fraction". Within a fuel bundle, the void fraction can vary from about zero at the base to about 0.7 near the top.

Continuing the example for the BWR, rear the bottom of a fuel bundle, neutron generation and density are relatively low, but the percentage of thermal neutrons is high because of the moderation provided by the low void fraction water at that level. Higher up, neutron density reaches its maximum, while void fraction continues to climb. Thus, the density of thermal neutrons peaks somewhere near the lower-middle level of the bundle. Above this level, neutron density remains roughly stable while the percentages of epithermal and fast neutrons increase. Near the top of the bundle, neutron density decreases across the spectrum since there are no neutrons being generated just above the top of the bundle.

The inhomogeneities induced by this spectral distribution can cause a variety of related problems. Focusing on the upper-middle section, problems of inadequate burnup and increased production of high-level transuranic waste are of concern. Since the upper-middle section has a relatively low percentage of thermal neutrons, a higher concentration of of fissile fuel is sometimes used to support a chain reaction. If the fuel bundle has a uniform fissile fuel distribution, this section could fall below criticality (the level required to sustain a chain reaction) before the other bundle sections. The fuel bundle would have to be replaced long before the fissile fuel in all sections of the bundle were depleted, wasting fuel.

The problem with waste disposal is further aggravated at this upper-middle section since the relatively high level of epithermal neutrons results in increased production of actinide-series elements such as neptunium, plutonium, americium, and curium, which end up as high level-waste.

One method of dealing with axial spectral variations is using a control rod. For the BWR, control rods typically extend into the core from below and contain neutron-absorbing material which robs the adjacent fuel of thermal neutrons which would otherwise be available for fissioning. Thus, control rods can be used to modify the distribution of thermal neutrons over axial position to achieve more complete burnups. However, control rods provide only a gross level of control over spectral density.

More precise compensation for spectral variations can be implemented using enrichment variation and burnable poisons. Enrichment variation using, for example, $U^{235}$ enriched uranium, can be used near the top of a fuel bundle to partially compensate for a localized lack of thermal neutrons. Similarly, burnable poisons such as gadolinium oxide ($Gd_2O_3$), can balance the exposure of bundle sections receiving a high thermal neutron flux. Over time, the burnable poisons are converted to isotopes which are not poisons so that more thermal neutrons become available for fissioning as the amount of fissile material decreases. In this way, fissioning can remain more constant over time in a section of the fuel bundle. By varying the amount of enrichment and burnable poisons by axial position along a bundle, longer and more complete burnups can be achieved. In addition, the enrichment and poison profiles can be varied by radial position to compensate for radial variations in thermal neutron density.

Nonetheless, taken together, the use of control rods, radial positional exchange of bundles, selective enrichment and distribution of burnable poisons still leave problems with axial variations in burn rates and neutron spectra. Furthermore, none of these employed methods effectively address the problem of the high level of fissile material produced and left in the upper-middle sections of the bundle due to the high level of epithermal neutrons and the low level of thermal neutrons. What is needed is a system that deals more effectively with axial spectral variations in neutron flux so that higher fuel burnups are provided and so that high-level waste is minimized.

Furthermore, since water is used as the coolant in a conventional BWR, it becomes contaminated with impurities, or crud, as it is circulated through the reactor, piping, and the typical steam turbine being powered by the steam generated by the BWR. The crud is undesirable in the reactor since it may accumulate on the fuel rod cladding and decrease heat transfer rates between the rods and the coolant water flowable thereover. The decreased heat transfer rate allows the fuel temperature to rise which decrease reactivity. Furthermore, increased clad temperatures can lead to a shorter mechanical lifetime of the fuel rods. Accordingly, the reactor should include suitable means to ensure that the crud may be removed from the coolant for reducing or preventing crud buildup on the fuel bundles.

OBJECTS OF THE INVENTION

A major object of the present invention is to provide for more thorough fuel burnups to enhance fuel utilization and minimize active waste products.

Another object of the present invention is to provide a new and improved reactor effective for using axial variations in neutron flux density and in a neutron spectral distribution for both converting fertile fuel to fissile fuel, and providing more uniform and complete fuel fissioning during the life of the fuel in the reactor core.

Another object of the present invention is to provide a new and improved reactor having a bi-level core in the form of an axially stacked steam cooled reactor (SCR) and a boiling water reactor (BWR) including means for removing crud from the reactor coolant.

DISCLOSURE OF INVENTION

In accordance with the present invention, a nuclear reactor with a recirculating heat transfer fluid has a bi-level core which provides enhanced flexibility in fuel arrangement. The bi-level core includes a first core, a plurality of steam separators disposed above the first core, and a second core disposed above the steam separators all inside a single pressure vessel. The steam separators receive a steam and water mixture from the first core and separate the water from the steam. The separated steam is channeled to the second core which cools the second core resulting in the generation of superheated steam. Preferably, fuel bundles of the second core are arranged in vertical alignment with the interposed steam separator and fuel bundles of the first core. This permits a fuel bundle of the first core to be accessed by removing all three elements as a single assembly. During refueling operations, fuel bundles can be shifted from one core to the other, providing additional flexibility in arranging units at various stages of burnup. The bi-level core allows fuel to be initially positioned in the second core for conversion of fertile fuel to fissile fuel, and then repositioned to the first core for more complete axial burnup. The steam separators disposed between the first and second cores control the quality of steam channeled into the second core, and allow crud to remain in solution in the separated water for being removed during operation by a reactor water cleanup system without buildup in either core.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
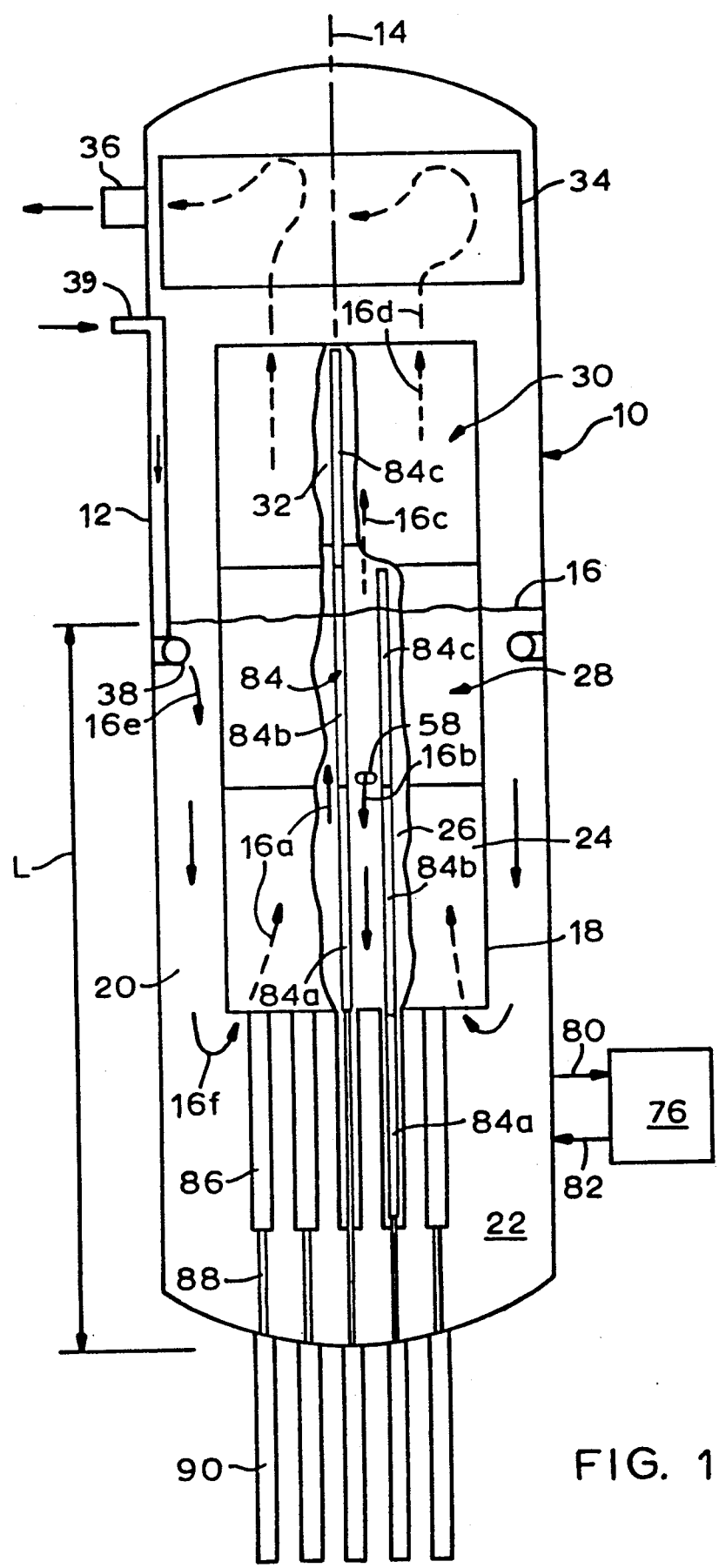
FIG. 1 is a schematic elevation sectional view of a reactor having a bi-level core in accordance with one embodiment of the present invention.

Illustrated schematically in FIG. 1 is a nuclear reactor 10 in accordance with an exemplary embodiment of the present invention. The reactor 10 includes an annular reactor pressure vessel 12 having a vertical, or longitudinal centerline axis 14. The vessel 12 contains a reactor coolant 16, such as water, filling the vessel 12 to a preselected level L near the upper middle portion of the vessel 12 between its top and bottom heads.

An annular core shroud 18 extends coaxially about the centerline axis 14 and is spaced radially inwardly from the vessel 12 to define an annular downcomer 20. The core shroud 18 is also spaced upwardly from the bottom end of the vessel 12 to define a conventional lower plenum 22 disposed in flow communication with the downcomer 20.

A first, or lower, reactor core 24 is disposed at the bottom of the core shroud 18 in flow communication with the lower plenum 22. The lower core 24 includes a plurality of conventional first, or lower, fuel bundles 26 configured in a conventional first two-dimensional array or matrix with adjacent fuel bundles 26 being laterally, or radially, spaced apart as is conventionally known. The lower core 24 operates as a boiling water reactor (BWR) which heats and boils the water 16$f$ received from the lower plenum 22 to form a steam and water mixture 16$a$ which rises upwardly through the lower core 24.

A plurality of laterally spaced apart steam separators 28 are disposed above the lower core 24 in flow communication therewith for receiving the steam and water mixture 16$a$, and are effective for separating the water as liquid, i.e. separated water 16$b$, from the steam, i.e. separated steam 16$c$.

A second, or upper reactor core 30 is disposed within the core shroud 18 above the steam separators 28 in flow communication therewith for receiving and heating the separated steam 16$c$ to form superheated steam 16$d$. The upper core 30 heats the separated steam 16$c$ which thereby cools the upper core 30 thusly forming a steam cooled reactor (SCR). The upper core 30 includes a plurality of conventional second, or upper fuel bundles 32 similarly conventionally configured in a second two-dimensional array or matrix.

In this exemplary embodiment, the core shroud 18 is used and defines the downcomer 20. However, in alternate embodiments, the core shroud 18 may be eliminated, and therefore, the first core 24, the steam separators 28, and the second core 30 are spaced radially inwardly from the vessel 12 to define the downcomer 20.

The superheated steam 16$d$ flows upwardly from the upper core 30 into a conventional steam dryer 34 which removes any remaining moisture therefrom and is then discharged from the reactor 10 through a conventional outlet nozzle 36. The reactor 10 also includes a conventional annular feedwater sparger 38 disposed above the lower core 24 and in flow communication with the downcomer 20 for conventionally channeling into the downcomer 20 relatively cool feedwater 16$e$ piped from an inlet nozzle 39 which mixes with the water 16 in the downcomer 20, flows downwardly into the lower plenum 22 and then flows into the lower core 24 as inlet water 16$f$.

The water 16 is naturally circulated within the vessel 12 by the difference in density of the water 16, with its density being greatest in the downcomer 20 due to its relatively low temperature, and its density being relatively low in the lower core 30 since it is relatively hot and mixed with steam in the steam and water mixture 16$a$. Optionally, conventional pumping means such as jet pumps or reactor internal pumps (not shown) can be used to further assist recirculation.

The lower and upper fuel bundles 26, 32 preferably share a common form, i.e. substantially identical in configuration so that each fuel bundle can be placed in any position in either matrix. During refueling operations net transfers are as follows: spent bundles are removed from the lower core 24, partially spent bundles from the upper core 30 are inserted into the lower core 24, and fresh bundles are inserted into the upper core 30. This fuel bundle shuffling is an average refueling scheme and does not exclude the possibilities that some bundles are retired from the upper core 30, some fresh fuel bundles are inserted into the lower core 24, and that some partially spent fuel bundles are transferred from the lower core 24 to the upper core 30.

Due to heating by the cores 24 and 30, and due to water/steam separation by the separators 28, the steam void fraction of the water 16 increases at higher levels in the vessel 12 so that the steam void fraction is greatest at the top of the upper core 30 than it is at the bottom of the lower core 24. Accordingly, neutron moderation is more effective at the lower level than at the upper level. Because of the difference in moderation, fuel bundles 32 in the upper core 30 are subjected to a harder neutron spectrum than are the fuel bundles 26 in the lower core 24.

The harder neutron spectrum can be taken advantage of by the fresh fuel bundles in the upper core 30. The harder neutron spectrum contains a higher percentage of fast and epithermal neutrons, while the thermal neutron spectrum contains a higher percentage of slower thermal neutrons. Thermal neutrons are more effective than faster neutrons at causing fission. The faster neutrons are more likely to be subjected to capture or resonance absorption reactions which do not result in fission.

Non-fissioning neutron absorption results in isotopic enhancement. In other words, the hard neutron spectrum converts fertile material to fissile fuel. The primary reaction is the absorption of a fast neutron by fertile $U^{238}$ to yield fissile $Pu^{239}$ through a relatively short-lived radioactive decay chain. Neutron absorption by $Pu^{239}$ can result in fission or in the formation of the next plutonium isotope, fertile $Pu^{240}$. Neutron absorption by fertile $Pu^{240}$ results in a fissile $Pu^{241}$ isotope. The net effect of the hard neutron spectrum is production of additional fissile material as the original fissile material is partially spent. Furthermore, other transuranics which are formed through various nuclear reactions and radioactive decay chains have a good likelihood to fission in the hard spectrum, producing useful energy and minimizing high level, actinide-series waste products. Thus, the relatively hard neutron spectrum of the upper fuel bundles 32 can be used to convert fertile fuel to fissile fuel and minimize waste poisons, enhancing the operational lifetime of a fuel bundle.

The harder neutron spectrum in the upper core 30 is less effective in inducing fission. This is not a problem where relatively fresh fuel bundles in the upper core 30 are fuel enriched to contain relatively high concentrations of fissile fuel, for example, $U^{235}$. As the $U^{235}$ is depleted faster than additional fissile fuel is created, the hard neutron spectrum would eventually be unable to support a chain reaction. Prior to this point, the no-longer-fresh fuel bundle can be transferred from the upper core 30 to the lower core 24, which is exposed to a more thermal neutron spectrum.

Since thermal neutrons are most effective at inducing fission, fuel in the lower core 24 can be more fully utilized. This provides advantages in fuel economics as well as waste disposal. Since the fuel in the lower core 24 is subjected to a thermal spectrum, the ratio of capture and resonance absorption to fission reactions is less, resulting in less conversion of fertile materials and less high-level waste. Thus, isotopic enhancement, which might otherwise contribute to higher levels of long lived radioactivity in the spent fuel elements due to plutonium production, is minimized in the soft neutron spectrum of the lower core 24.

The present invention provides for enhanced fuel arrangement flexibility which can take advantage of axial neutron spectral shifts through the core. As a result, fuel lifetimes are increased and the quantity of high-level nuclear waste is minimized. These and other features and advantages of the present invention are apparent in the following detailed description.

The bi-level fuel bundle arrangement of the present invention provides additional flexibility in the redistribution of fuel bundles during refueling operations. In particular, an axial level, in addition to the conventional radial array position, can be selected for each fuel bundle. This provides for a refueling scheme in which fresh or low burnup fuel bundles are installed in upper core 30 where a harder neutron spectrum can convert fertile fuel to fissile fuel. Partially spent, or medium to high burnup, fuel bundles can be moved from upper core 30 to the lower core 24 where the more thermal, or soft, neutron spectrum can more effectively utilize, or fission, the remaining fissile fuel. Fertile fuel conversion is minimized in the lower core 24 due to the soft neutron spectrum so that a relatively complete burnup is possible while minimizing the quantity of high-level radioactive waste products in the lower fuel bundles 26.

Fuel bundles in a conventional one-level core are typically subject to several burn cycles before being disposed. At each refueling outage, the bundles are redistributed radially in the matrix with those having less burnup being moved to alternate radial positions for obtaining more complete burnup in view of the radial variation in neutron flux density and spectral distribution. Once a fuel bundle is substantially burned, i.e. has undergone substantially complete fission, it is then retired from the core. Accordingly, the present invention allows for additional flexibility in fuel management by allowing axial, as well as radial, redistribution of fuel bundles. Fresh, or low burnup fuel is preferably provided in the upper core 30, and medium to high burnup fuel is preferably provided in the lower core 24. The low burnup fuel for the upper core 30 may come from radial redistribution within the upper core 30 itself, and the medium or high burnup fuel for the lower core 24 preferably comes from the upper core 30, with a portion thereof coming from radial redistribution of the lower core 24 as desired.

The present invention provides for cores with two or more levels of fuel bundles, which can be monolithic or contain multiple elements. The bundles on a level can be packed in two-dimensional arrays, or matrices, as triangles, rectangles including squares, or hexagons. Other packing shapes may also be used. Some embodiments employing control rods need not use them at all core levels. Power output regulation can be conventionally effected using burnable poisons, adjusting coolant flow and temperature, and/or using other power regulation approaches. Access to the lower core 24 can be through the upper core 30, from the bottom, or through lateral access.

The lower core 24 is operated as a conventional boiling water reactor which converts the subcooled inlet water 16$f$ to a predeterminedly high-void fraction mixture 16$a$ at about 7.0 MPa and about 271° C. The upper core 30 is fed by the separated steam 16$c$ from the separators 28 and converts it to the superheated steam 16$d$, for example, at about 7.0 MPa and temperatures greater than about 271° C. The fuel bundle configuration or mechanical design for the two stages is preferably identical, and the upper core 30 is loaded with fresh or low burnup fuel while the lower core 24 is loaded with fuel that has undergone at least one cycle of exposure in the upper core 30 as described above. After complete burnup operation in the lower core 24, the fuel is discharged.

Accordingly, the lower core 24 provides a compact steam input source for the steam cooled upper core 30 without the need for complex and inefficient steam blowers and injectors to achieve steam circulation as found in conventional steam cooled reactor concepts. Neither is there a need for conventional contact boilers to provide the steam source.

The movement of fuel from the upper to the lower cores has several advantages. It initially maximizes in the upper, or converter, core 30 the conversion ratio of fertile $U^{238}$ and $Pu^{240}$ by resonance capture in the hard neutron spectrum, isotopically enhancing the fertile fuel to fissile fuel $Pu^{239}$ and $Pu^{241}$. Subsequently, it maximizes in the lower, or burner, core 24 burnout of the Pu in the thermal spectrum of the boiling stage, while limiting conversion of $U^{238}$ near the end of bundle life. Furthermore, maximum flexibility is provided for achieving power distribution shaping by means of increased fuel enrichment in the upper core 30, which is not wasted since remaining fuel from the upper core 30 is subsequently burned in the lower core 24, and by means of burnable poisons in the lower core 24 to reduce burnup in the lower core 24 to better match the burnup in the upper core 30 for obtaining a more uniform axial burnup.

With uranium fuel, the upper core 30 effects relatively high conversion with a nuclear lifetime of about 150,000 megawatt day per metric tonne (MWD/Tonne) being attainable. With plutonium fuel, the upper core 30 can be designed to breed fuel, with a nuclear lifetime of about 200,000 MWD/Tonne being attainable. In either case, high conversion is achieved and significant reductions in the generation of high-level waste is realized by first burning in the upper core 30, then subsequently burning in the lower core 24. This offers the advantage of recycling the converted fertile fuel from the upper core 30 to the lower core 24, and burnup in the lower core 30 of significant quantities of remaining high level wastes which did not fission during its residence in the upper core 30, without having to conventionally chemically reprocess the fuel.

It should be appreciated that the reactor 10 has a neutron spectrum from the bottom of the lower core 24 to the top of the upper core 30 which is varying from relatively soft to hard. As indicated above, axial variation in both neutron flux density and neutron spectrum occurs from boiling the water 16 and creating void fractions. Since the steam 16$c$ is channeled upwardly through the upper core 30 and undergoes superheating, the neutron spectrum therein is relatively hard and substantially harder than that found in the lower core 24.

Accordingly, the reactor 10 may take advantage of this axial variation in neutron spectrum with the resulting hard neutron spectrum in the upper core 30, which is substantially greater than that found in a conventional BWR to provide fertile fuel conversion to fissile fuel. The upper core 30 may then be considered a converter stage, and as mentioned above, with plutonium used as a fuel, the upper core 30 can be designed to breed fuel, i.e., generate more usable fuel than it consumes.

Accordingly, the upper fuel bundles 32 preferably include fertile fuel which forms fissile fuel by conversion due to the hard neutron spectrum. And, the lower fuel bundles 26 preferably include fissile fuel which is fissionable due to the soft neutron spectrum found in the lower core 24.

In order to more easily redistribute the upper fuel bundles 32 into the lower core 24 for use as the lower fuel bundles 26, the upper and lower fuel bundles 32 and 26 are preferably identical in configuration having the same height and lattice arrangement. And, each of the steam separators 28 is preferably vertically aligned with and interposed between respective ones of the upper and lower fuel bundles 32, 36, and may be removed therewith as a single three-component assembly, if desired.

Figure 2:
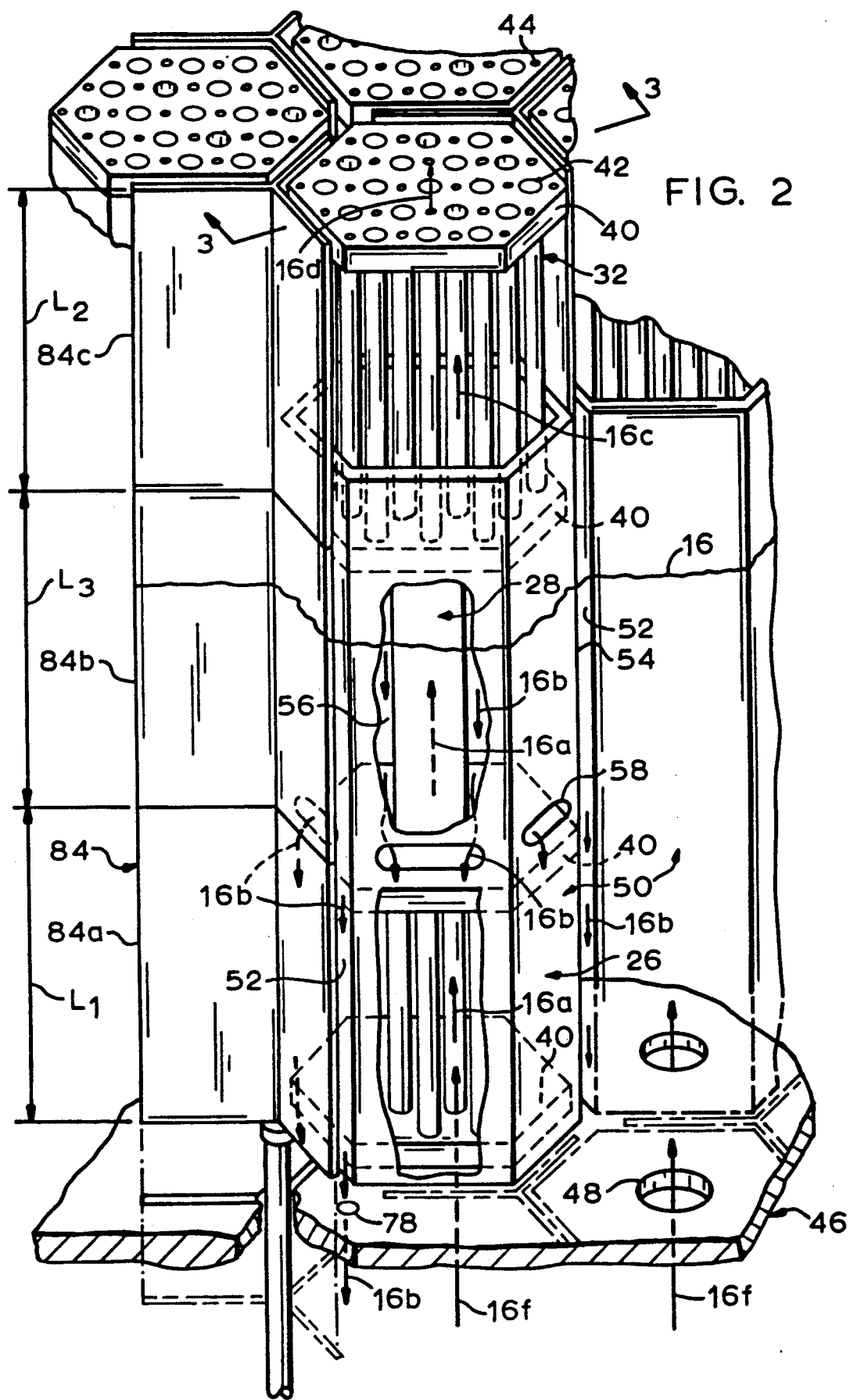
FIG. 2 is a schematic perspective representation of a portion of the bi-level core illustrated in FIG. 1 including two exemplary fuel bundles of the upper and lower cores, including a steam separator therebetween, in accordance with an exemplary embodiment of the present invention.

More specifically, illustrated in FIG. 2 is an exemplary configuration of the lower and upper fuel bundles 26 and 32 in a hexagonal lattice. The lower and upper fuel rods thereof are preferably arranged in a hexagonal configuration and spatially joined together in the transverse, or radial plane, by a pair of axially spaced apart tie plates 40. Each of the tie plates 40 includes a respective aperture 42 through which a respective fuel rod is positioned, along with additional flow apertures 44 through which the inlet water 16f, mixture 16a, separated steam 16c, and superheated steam 16d flow, respectively.

Accordingly, each of the lower and upper fuel bundles 26 and 32 are preferably identical and have an identical radial configuration, e.g., hexagonal, and identical longitudinal length $L_1$ and $L_2$ so that individual ones of the upper fuel bundles 32 may be simply axially redistributed into the lower core 24 to replace one of the lower fuel bundles 26. This is a significant advantage of the present invention since the preburned upper fuel bundles 32 may be moved from the upper core 30, subject to the hard neutron spectrum, to the lower core 24, subject to the soft neutron spectrum, wherein they may be more fully and completely burned. In this way, when the upper fuel bundles 32 are initially positioned in the upper core 30 they may be provided with more fuel enrichment for obtaining a more uniform axial power distribution from the entire reactor 10 without wasting such enriched fuel as would occur in a conventional single level reactor wherein such enriched fuel could not practically be reutilized. But, in accordance with the present invention, the upper fuel bundles 32 may be recycled into the lower core 24 for more complete burning.

Furthermore, in an alternate embodiment where the fuel pellets from the lower and upper fuel bundles 26, 32 are reprocessed for separating and collecting substantial amounts of actinide-series elements, the collected actinide-series elements may be formed into pellets along with other fissile and fertile fuel makeup to be preferably placed in the upper fuel bundles 32 for being exposed to the hard neutron flux to fission and produce useful energy while further decreasing the high level wastes associated therewith.

As illustrated in FIG. 2, the lower fuel bundles 26 may be conventionally simply supported on a lower stationary support plate 46 at the bottom of the lower core 24, which support plate 46 has a plurality of flow apertures 48 extending axially therethrough. These flow apertures 48 allow the inlet water 16f to circulate upwardly through the lower core 24 and between adjacent fuel bundles and within individual fuel bundles as is conventionally known.

Since water, or a water/steam mixture is not being channeled past the upper fuel bundles 32, conventionally required flow channels or baffles are not required, and, therefore, the upper fuel rods are disposed directly in contact with the separated steam 16c which is allowed to flow freely between adjacent fuel rods of adjacent upper fuel bundles 32. However, since the water 16a flows upwardly over the lower fuel bundles 26, suitable flow channels or baffles are still required for controlling the flow thereof.

More specifically, in one embodiment of the present invention each of the lower fuel bundles 26 is disposed in an annular flow baffle 50 for its entire axial length $L_1$. The baffle 50 is hexagonal to match the hexagonal fuel bundles and channel therethrough and over the fuel rods the inlet water 16f for forming the steam and water mixture 16a. Each of the flow baffles 50 may be permanently attached to the lower support plate 46 so that the lower and upper fuel bundles 26 and 32 may remain identical in configuration, and, upon axial redistribution thereof, one of the lower fuel bundles 26 may be removed from within its baffle 50 and replaced by one of the upper fuel bundles 32. The tie plates 40 are preferably complementary in shape, i.e., hexagonal, so that they fit within the baffles 50. Alternatively, the baffles 50 may be provided as separate components in which the lower fuel bundles 26 are placed prior to being positioned in the lower core 24 above the support plate 46.

Adjacent ones of the baffles 50 are spaced from each other to define a longitudinally extending bypass channel 52 for receiving and channeling downwardly the separated water 16b from the steam separators 28. Each of the baffles 50 extends upwardly above the first fuel bundle 26 to define an annular skirt portion, or simply skirt 54 spaced around a respective one of the steam separators 28 to define therewith a skimmer discharge passage 56. Since the skirt 54 is a portion of the baffle 50 it too is hexagonal in this exemplary embodiment. Each of the skirts 54 includes a plurality of circumferentially spaced bypass inlets 58 for channeling the separated water 16b from the steam separator 28 downwardly into the bypass channel 52.

Figure 3:
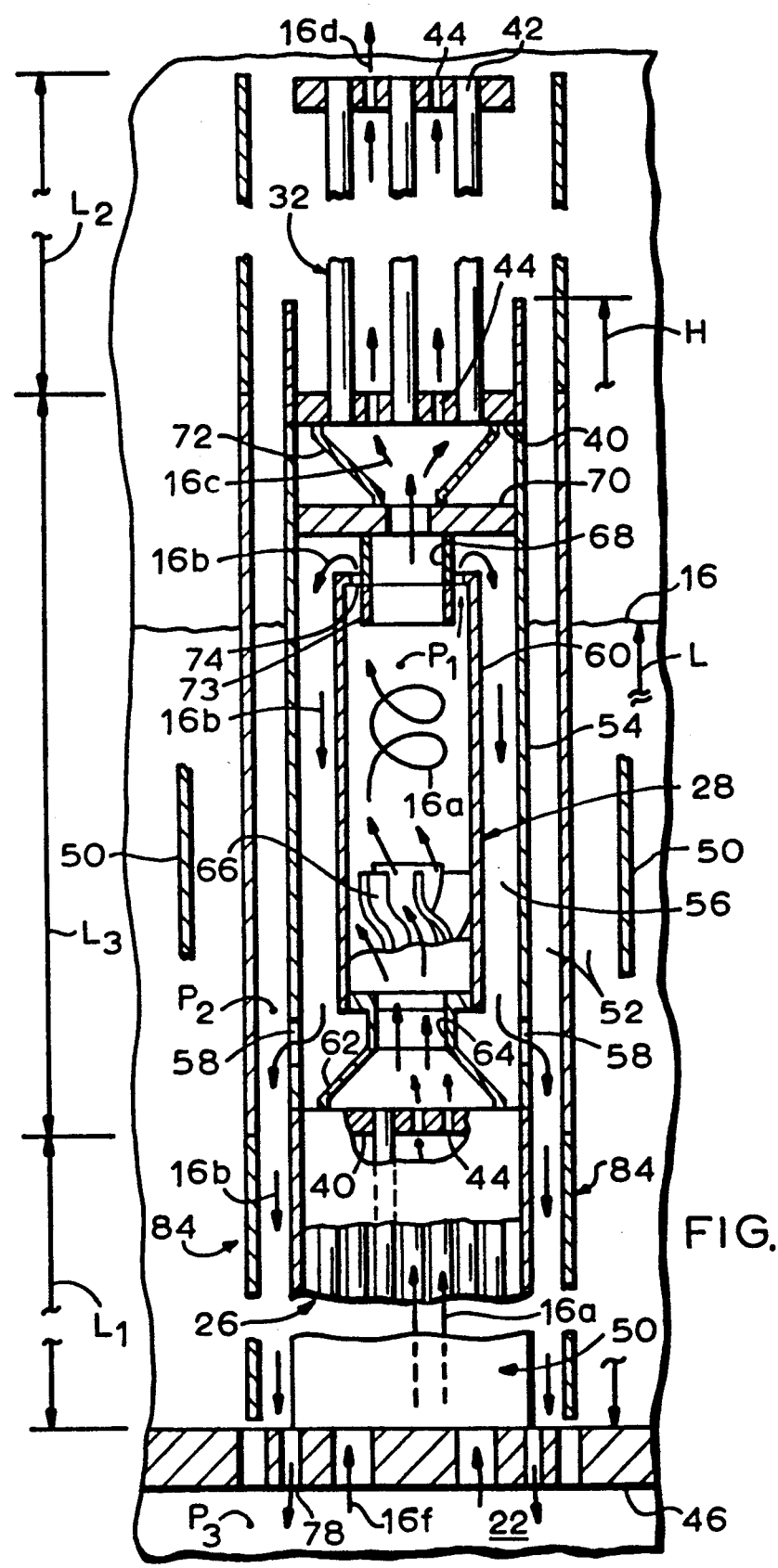
FIG. 3 is a longitudinal sectional view of the two fuel bundles, including the steam separator therebetween, illustrated in FIG. 2 taken along plane 3—3.

As shown in more particularity in FIG. 3, each of the steam separators 28 includes a tubular separating barrel 60 spaced radially inwardly from the skirt 54 to define the skimmer discharge passage 56. The separator 28 includes a first, imperforate nosepiece 62 generally of a truncated, tubular cone shape which defines an inlet 64 at the bottom of the separator 28 disposed in flow communication with a respective one of the first fuel bundles 26 for receiving the steam and water mixture 16a therefrom. The first nosepiece 62 is suitably sealingly joined to the upper tie plate 40 of the first fuel bundle 26 for receiving the mixture 16a from the flow holes 44, and converges upwardly and sealingly joins the separator inlet 64. The outer surface of the first nosepiece 62 forms a boundary for the lower part of the skimmer discharge passage 56 adjacent to the bypass inlets 58.

The steam and water mixture 16a is channeled upwardly into the barrel 60 through conventional swirl vanes 66 which swirl the mixture 16a radially outwardly for allowing centrifugal force to separate liquid from the steam, with the separated steam 16c being discharged from the top of the separator 28 through a central steam outlet 68. The steam outlet 68 in this exemplary embodiment is a tubular member fixedly mounted to an annular support plate 70, which in turn is fixedly mounted inside the skirt 54. A second conical nosepiece 72 is fixedly joined in flow communication to the steam outlet 68 through a central aperture in the support plate 70, and diverges upwardly and is fixedly and sealingly joined to the lower tie plate 40 of the upper fuel bundle 32. The separated steam 16c flows upwardly from the outlet 68, through the second nosepiece 72 and through the flow holes 44 of the lower tie plate 40 for flow upwardly into the upper fuel bundle 32.

An annular skimmer tube 73 extends downwardly from the steam outlet 68 inside the barrel 60. An annular skimmer liquid outlet 74 is disposed at the top of the separator barrel 60 and is in the form of a plurality of circumferentially spaced apertures disposed radially outwardly of the skimmer tube 73. Accordingly, as the mixture 16a is swirled by the swirl vanes 66 inside the barrel 60 the liquid is centrifuged radially outwardly toward the inner surface of the barrel 60 and flows upwardly between the skimmer tube 73 and barrel 60 and out of the liquid outlet 74 into the top of the skimmer discharge passage 56. The support plate 70 prevents the separated water 16b from flowing upwardly, which is instead, turned downwardly to flow through the skimmer discharge passage 56 and into the bypass inlets 58 for flow downwardly in the bypass channel 52. The steam separators 28 effectively use the skirt 54, which is a portion of the baffle 50, in separating liquid from steam. Although this exemplary embodiment of the steam separator 28 is a single stage separator, multi axial stage separators could also be used.

Since the water level L in the vessel 12 is below the upper core 30 and near the top of the steam separators 28, the baffle 50 need not extend upwardly to the top of the upper core 30 since its flow channeling function is not required. However, it may be extended to the top of the upper core 30 for providing a convenient passage for guiding the lower and upper fuel bundles 26 and 32 into their respective cores during refueling. In a preferred embodiment, the baffles 50, and more specifically the skirts 54, extend upwardly into the upper core 30 to a relatively short predetermined height H from the lower support plate 46 for maintaining a predetermined level of the water 16 in the bypass channels 52 to provide a suitable differential head for promoting separation by the separators 28 of the steam 16c from the steam and water mixture 16a. The level of the water 16 in the bypass channels 52 may be selected for preventing excessive carryunder of steam in the separated water 16b or excessive carryover of liquid in the separated steam 16c by selectively decreasing or increasing it, respectively.

For example, the steam and water mixture 16a at the top of the steam separator 28 is at a first pressure $P_1$, the separated water 16b in the bypass channel 52 adjacent to the bypass inlets 58 is at a second pressure $P_2$, and the pressure of the inlet water 16f just below the lower support plate 46 in the lower plenum 22 is at a third pressure $P_3$. By predeterminedly selecting the level L of the water in the bypass channels 52, the second pressure $P_2$ may be maintained greater than the third pressure $P_3$ and less than the first pressure $P_1$ to ensure travel of the separated water 16b from the steam separators 28 downwardly through the bypass channels 52 and into the lower plenum 22.

Furthermore, in the embodiment of the invention without the core shroud 18 described above, the separated water 16b discharged through the bypass inlets 58 may also flow radially outwardly, or horizontally as shown in FIGS. 2 and 3, between adjacent baffles 50 and around the control rods 84 to the downcomer 20 (FIG. 1) and then downwardly into the lower plenum 22.

The upwardly extending skirt 54 ensures that the water level L remains below the top of the skirt 54 and does not flow downwardly through the tops of the steam separators 28. In this way, the separated water 16b may be suitably channeled from the separators 28 and into the lower plenum 22 wherein any crud contained therein may be removed.

More specifically, and as shown schematically in FIG. 1, conventional water clean-up means 76 are provided for separating crud from the separated water 16b flowing in the bypass channels 52. The separated water 16b flows through a plurality of bypass outlets 78 in the lower support 46, as shown in FIG. 3, and into the lower plenum 22. The crud removing means 76 include a conventional removal conduit 80 disposed in flow communication with the lower plenum 22 for removing a portion of the water therein, including the separated water 16b, which is channeled through a conventional filter for removing the crud therefrom. A conventional return conduit 82 is disposed in flow communication with the lower plenum 22 for returning the filtered water back into the lower plenum 22.

Accordingly, the steam separators 28 may be used for withdrawing predetermined amounts of the separated water 16b for ensuring that any crud contained in the water remains in suspension therewith and may be channeled downwardly through the bypass channels 52 and into the lower plenum 22 so that the crud may be suitably removed. Buildup of the crud on the lower fuel bundles 26, as well as on the upper fuel bundles 32, may therefore be reduced or eliminated, thusly avoiding overheating the fuel bundles and adversely affecting the power distribution therefrom.

Furthermore, the quality of the separated steam 16c channeled to the upper core 30 may be maintained at a predetermined value during the operating range of the reactor 10. For example, the upper core 30 may be optionally operated without conventional control rods, and using instead, as an example, posion curtains containing boron. The boron is essentially transparent to the hard neutron spectrum and will allow the upper core 30 to remain critical. However, at an off-design point wherein the density of the superheated steam 16d is below the density at the design point, the poison curtain will cause the upper core 30 to automatically become subcritical. The steam separators 28 limit the change in density range to ensure normal operation without inadvertent shutdown due to undesirable density changes.

In the preferred embodiment illustrated in FIG. 1, a plurality of control rods 84 are disposed in the respective bypass channels 52 (see also FIGS. 2 and 3) for controlling reactivity of both the lower core 24 and the upper core 30. Since the fuel bundles 26, 32 and the baffles 50 are hexagonal in this exemplary embodiment, the control rods 84 are preferably Y-shaped in transverse section for vertical translation therebetween. In the exemplary embodiment illustrated in FIG. 1, a conventional control rod guide tube 86 extends downwardly from the lower core 24 and into the lower plenum 22, and a conventional control rod drive shaft 88 extends downwardly from the control rod 84 through the guide tube 86 and through the lower head of the vessel 12 into a conventional control rod drive 90. The several control rod drives 90 are conventionally effective for raising the shafts 88 upwardly for inserting the control rods into the respective cores for decreasing reactivity, and lowering the shafts 88 for withdrawing the control rods 84 from the respective cores for increasing reactivity.

Illustrated in more particularity in FIG. 2, each of the control rods 84 preferably includes a first or lower portion 84a disposed parallel to and longitudinally coextensively with the lower fuel bundles 26, i.e. they have about the same longitudinal length $L_1$ when inserted into the lower core 24. The lower portion 84a includes a conventional nuclear poison which reduces reactivity of the lower fuel bundles 26 when fully inserted into the lower core 24.

Each of the control rods 84 also includes a second, or middle portion 84b extending vertically upwardly from the first portion 84 and being integral therewith, which is disposed parallel to the steam separators 28 and longitudinally coextensively therewith, i.e. having the same longitudinal length $L_3$ when fully inserted. The middle portion 84b is inert, i.e. contains no nuclear poison, and is substantially transparent to neutrons. The middle portion 84b, along with the lower portion 84a, are also disposed in the bypass channel 52 when fully inserted.

Each of the control rods 84 further includes a third, or top portion 84c extending vertically upwardly from the middle portion 84b and being integral therewith, and is disposed parallel to the upper fuel bundles 32 and extends longitudinally coextensively therewith, i.e. having about the same longitudinal length $L_2$ when fully inserted into the upper core 30. The top portion 84c also contains a conventional nuclear poison for reducing reactivity in the upper fuel bundles 32 when fully inserted.

As shown in FIG. 1, the exemplary centermost one of the control rods 84 is shown in its fully inserted position with the lower portion 84a being fully inserted in the lower core 24, and the upper portion 84c fully inserted in the upper core 30. An exemplary second one of the control rods 84 is shown in its fully withdrawn position with the top portion 84c being fully withdrawn from the upper core 30 and into the bypass channel 52 between the separators 28 and between the lower and upper cores 24, 30, and the lower portion 84a being withdrawn below the lower core 24 and into the lower plenum 22. The middle portion 84b is withdrawn from between the separators 28 and into the lower core 24. In this way maximum reactivity of the lower core 24 and the upper core 30 may occur. Alternatively, the reactor 10 could be reconfigured so that the control rods 84 are withdrawn from the respective cores 24 and 30 upwardly therefrom.

In either embodiment, the control rod drives 90 are effective for selectively moving the control rods 84 for withdrawing to between the lower and upper cores 24 and 30 either the lower portion 84a or the upper portion 84c. In the preferred embodiment illustrated in FIG. 1, the control rod drives 90 are effective for moving downwardly the control rods 84 for withdrawing the upper portions 84c to the space between the lower core 24 and the upper core 30, and withdrawing the lower portion 84a into the lower plenum 22 below the lower core 24. And, the baffles 50 may additionally be used to guide the translation of the control rods 84 between adjacent ones of the respective fuel bundles 26, 32, and the steam separators 28.

The bi-level reactor 10 including the steam separators 28 in accordance with the present invention, therefore, allows for more complete axial burnup of the nuclear fuel in the lower core 24 and the upper core 30 by taking advantage of the axially varying neutron density and spectrum and the axial reshuffling of the fuel bundles between the upper core 30 and the lower core 24. The steam separators 28 built into the lower and upper fuel bundles 26 and 32 allows for the recirculation of the separated water 16b to the lower plenum 22 for removing crud therefrom by the crud removing means 76. The steam separators 28 also reduce the variation in quality of the separated steam 16c thus resulting in higher quality inlet steam to the upper core 30 operating as a steam cooled reactor. By positioning the steam separators 28 between the lower core 24 and the upper core 30, the control rods 84 can be withdrawn axially, either upwardly from the lower core 24 to the region between the lower core 24 and the upper core 30 containing the steam separators 28, or, alternatively, downwardly from the upper core 30 into that region.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A nuclear reactor comprising:
 a vessel containing water;
 a first core disposed in said vessel and containing a plurality of first fuel bundles configured in a first two-dimensional array for boiling said water to form a steam and water mixture;
 a plurality of steam separators disposed above said first core for receiving said steam and water mixture and being effective for separating said water from said steam; and
 a second core disposed in said vessel and containing a plurality of second fuel bundles configured in a second two-dimensional array disposed above said steam separators for receiving and heating said separated steam to form superheated steam.

2. A nuclear reactor according to claim 1 wherein each of said first fuel bundles is disposed in a flow baffle, adjacent ones of said baffles being spaced from each other to define a bypass channel for receiving and channeling said separated water away from said steam separators.

3. A nuclear reactor according to claim 2 wherein each of said baffles extends upwardly above said first fuel bundle to define a skirt spaced around a respective one of said steam separators, said skirt including a plurality of circumferentially spaced bypass inlets for channeling said separated water from said steam separator into said bypass channel.

4. A nuclear reactor according to claim 3 wherein each of said steam separators includes:

an inlet disposed in flow communication with said respective first fuel bundle for receiving said steam and water mixture therefrom;

a steam outlet disposed in flow communication with a respective one of said second fuel bundles for channeling thereto said separated steam; and a liquid outlet disposed in flow communication with said bypass inlets for channeling said separated water into said bypass channel.

5. A nuclear reactor according to claim 4 wherein said skirts extend upwardly into said second core to a predetermined height above said steam separators for maintaining a predetermined level of said water in said bypass channels to provide a differential head for promoting separation of said steam from said steam and water mixture in said steam separators.

6. A nuclear reactor according to claim 4 further including means for separating crud from said separated water flowing in said bypass channels.

7. A nuclear reactor according to claim 6 wherein:

said bypass channels include a plurality of bypass outlets disposed in a lower support plate supporting said first core for channeling said separated water into a lower plenum disposed below said first core; and said crud separating means include a removal conduit disposed in flow communication with said lower plenum for removing a portion of said water therein including said separated water, a filter for removing said crud from said water, and a return conduit for returning said filtered water back to said lower plenum.

8. A nuclear reactor according to claim 4 further including a plurality of control rods disposed in respective bypass channels and each including:

a first portion disposed longitudinally coextensively with said first fuel bundles and containing a nuclear poison;

a second portion disposed longitudinally coextensively with said steam separators and being inert;

a third portion disposed longitudinally coextensively with said second fuel bundles and containing a nuclear poison; and said control rods being movable longitudinally for controlling reactivity of said first and second cores.

9. A nuclear reactor according to claim 8 further including a plurality of control rod drives joined to said control rods, respectively, for selectively moving said control rods for withdrawing between said first and second cores either said first or third portions thereof.

10. A nuclear reactor according to claim 8 wherein said control rod drives are disposed below said first core and are effective for moving downwardly said control rods for withdrawing said third portion to between said first and second cores, and said first portion to below said first core.

11. A nuclear reactor according to claim 10 wherein said first and second fuel bundles are substantially identical in configuration and aligned longitudinally.

12. A nuclear reactor according to claim 11 further including means for separating crud from said separated water flowing in said bypass channels.

13. A nuclear reactor according to claim 4 wherein said first and second fuel bundles are substantially identical in configuration and aligned longitudinally.

* * * * *